(12) United States Patent
Konig et al.

(10) Patent No.: US 9,451,090 B2
(45) Date of Patent: Sep. 20, 2016

(54) SYSTEM AND METHOD FOR PERFORMANCE-BASED ROUTING OF INTERACTIONS IN A CONTACT CENTER

(71) Applicant: GENESYS TELECOMMUNICATIONS LABORATORIES, INC., Daly City, CA (US)

(72) Inventors: Yochai Konig, San Francisco, CA (US); Herbert Willi Artur Ristock, Walnut Creek, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 14/068,959

(22) Filed: Oct. 31, 2013

(65) Prior Publication Data
US 2015/0117632 A1 Apr. 30, 2015

(51) Int. Cl.
*H04M 3/51* (2006.01)
*H04M 3/523* (2006.01)

(52) U.S. Cl.
CPC ......... *H04M 3/5233* (2013.01); *H04M 3/5166* (2013.01); *H04M 2203/408* (2013.01)

(58) Field of Classification Search
CPC .................................................. H04M 3/5166
See application file for complete search history.

(56) References Cited

U.S. PATENT DOCUMENTS

| | | | | |
|---|---|---|---|---|
| 6,333,980 | B1 * | 12/2001 | Hollatz et al. | 379/265.12 |
| 6,707,903 | B2 | 3/2004 | Burok et al. | |
| 6,718,330 | B1 * | 4/2004 | Zenner | G06Q 30/02 707/694 |
| 7,487,094 | B1 | 2/2009 | Konig et al. | |
| 7,734,032 | B1 * | 6/2010 | Kiefhaber et al. | 379/265.01 |
| 8,238,541 | B1 * | 8/2012 | Kalavar | H04M 3/5175 379/265.06 |
| 8,787,540 | B1 * | 7/2014 | Scott | 379/93.23 |
| 2007/0291737 | A1 * | 12/2007 | Mohan | H04M 3/5125 370/352 |
| 2008/0095355 | A1 | 4/2008 | Mahalaha et al. | |
| 2010/0086120 | A1 * | 4/2010 | Brussat et al. | 379/265.12 |
| 2013/0030854 | A1 | 1/2013 | McCormack et al. | |

FOREIGN PATENT DOCUMENTS

| | | |
|---|---|---|
| KR | 10-0625499 B1 | 9/2006 |
| WO | 9900966 A1 | 1/1999 |

OTHER PUBLICATIONS

Genesys Telecommunications Laboratories, Copyright 2013, Genesys Text Analytics, The Most Accurate and Comprehensive Multichannel Interaction Analysis, http://wwvv.genesyslab.com/products/genesys-text-analytics/overview.aspx, Oct. 22, 2013, 2 pages.

Nuance Communications, Inc., Copyright 2013, Nina—The intelligent multichannel virtual assistant, Self service with an intelligent touch of humanity, http://www.nuance.com/landing-pages/products/nina/default.asp, Oct. 22, 2013, 8 pages.

International Search Report and Written Opinion for PCT/US2014/063582, mailed on Jan. 29, 2015, 12 pages.

* cited by examiner

*Primary Examiner* — Harry S Hong
(74) *Attorney, Agent, or Firm* — Lewis Roca Rothgerber Christie LLP

(57) ABSTRACT

A system and method for performance-based routing of interactions in a contact center. A routing server receives information on an interaction to be routed, and identifies a call reason for the interaction. The identification of the call reason may be based, for example, speech analytics. The routing server identifies one or more agents having experience in handling the topic. The routing server further determines a proficiency level of the identified agents in handling the topic, and selects one of the identified agents having at least a minimum level of proficiency. The routing server transmits a message for routing the interaction to the selected agent.

18 Claims, 11 Drawing Sheets

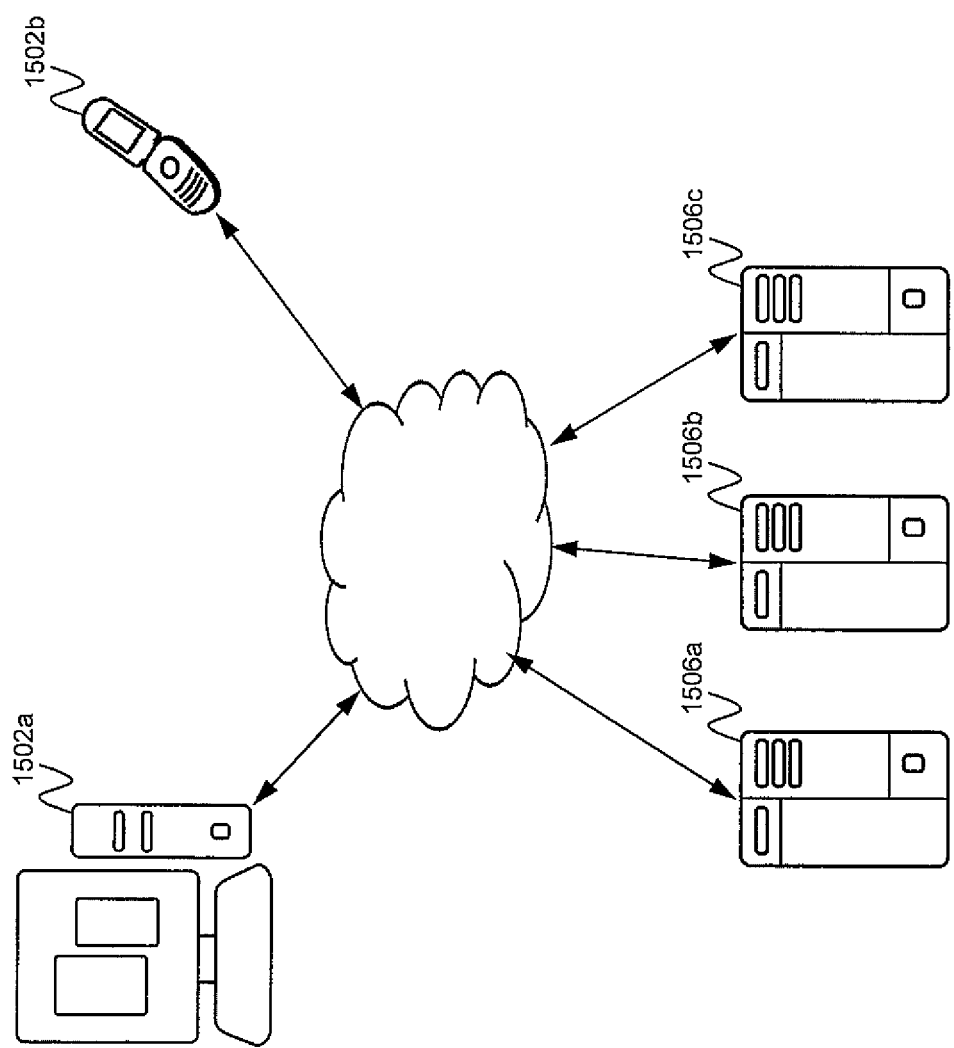

SYSTEM AND METHOD FOR PERFORMANCE-BASED ROUTING OF INTERACTIONS IN A CONTACT CENTER

BACKGROUND

Businesses use contact centers that include automated systems and representatives of the business to process transactions and/or service the needs of their customers. Contact centers may use a number of communication channels to engage the customers, such as telephone, email, live web chat, and the like.

An interaction from a customer such as, for example, an inbound voice call, is routed to a contact center target, such as, for example, a contact center agent, for processing. In simplest terms, routing is a process of sending the interaction to the target, such as, for example, sending an incoming telephone call or an incoming e-mail, to an agent. In practice, many steps are taken between the arrival of the interaction and the selection and use of a target. Generally speaking, not all interactions should go to the same target; choices should be made in order to determine the best target for each interaction. Each choice-point is an opportunity to make a decision based on the current situation—with the general goal of getting the interaction delivered to the right target.

SUMMARY

Embodiments of the present invention are directed to a system and method for performance-based routing of interactions in a contact center. A processor receives information on an interaction to be routed. The processor identifies a topic associated with the interaction, and identifies one or more agents having experience handling the topic. The processor further determines a proficiency level of the identified agents in handling the topic, and selects one of the identified agents having at least a minimum level of proficiency in handling the topic. The processor transmits a message for routing the interaction to the selected agent.

According to one embodiment, the proficiency level of a particular agent is calculated based on past interactions by the particular agent in handling interactions with a same topic.

According to one embodiment, the proficiency level of a particular agent is indicative of the ability of the particular agent to resolve the topic a first time the topic is raised in an interaction. In this regard, according to one embodiment, the processor recognizes a phrase uttered by a customer or agent during a past interaction, categorizes the past interaction as being unresolved based on the recognized phrase, and calculates the proficiency level based on a number of past interactions categorized as being unresolved.

According to one embodiment, the proficiency level of a particular agent is indicative of a time it takes the agent in handling interactions associated with the topic.

According to one embodiment, the topic is identified as a specific agent skill, wherein identifying by the processor the one or more agents includes identifying by the processor one or more agents with the specific agent skill enabled.

According to one embodiment, the selecting of one of the identified agents having at least a minimum level of proficiency includes identifying, by the processor, a threshold performance value; comparing, by the processor, the proficiency level of the identified agents against the threshold performance value; and selecting, by the processor, the one of the identified agents based on the comparison.

According to one embodiment, the identifying of the topic includes recognizing a phrase uttered by a customer or agent; and identifying the topic based on the recognized phrase. The phrase may be uttered during interaction by the customer with an interactive media response server.

As a person of skill in the art should appreciate, embodiments of the present invention provide an interaction handling mechanism that allow deducing a caller's reason for a call at a higher level of granularity than what may be achieved via traditional mechanisms alone, and for that call for which the reason may be deduced at the finer level of granularity, route the call to an agent who has proven, based on past handling of similar interactions, to be able to actually handle the current call than another agent who may have proven to be less qualified to handle the call. Embodiments of the present invention therefore allow better service to be provided to the caller.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 8E is a block diagram of a network environment including several computing devices according to an embodiment of the present invention.

DETAILED DESCRIPTION

In general terms, embodiments of the present invention are directed to a system and method for routing interactions with specifically recognized issues, to agents deemed to have actual proficiency in handling those issues. According to one embodiment, the specific issues are recognized by deducing a caller's reason for a call at a finer level of granularity than what is achieved via traditional mechanisms alone. The granular call reason may be deduced, for example, by recognizing specific phrases uttered by a caller and/or agent during a current call, or based on utterances spoken and recognized by a speech analytics system during a prior call. Other mechanisms in addition or in lieu of speech analytics may be invoked to deduce/infer the granular call reason. For example, information gathered from the caller interacting with a self-help system or other communication channel(s) (e.g. web, chat, email, social media message, etc.) may be used to deduce a particular call reason(s).

For those calls for which a granular call reason may be deduced, the call is routed to an agent who has proven to have, based on past handling of other calls with the same call reason, actual proficiency in handling the call reason. According to one embodiment, an agent's actual performance or proficiency is measured in terms of one or more performance metrics. A particular performance metric may measure, for example, a number (e.g. percentage) of unresolved calls, an average handling time, and/or customer satisfaction resulting from the agent handling calls with a particular call topic. In this manner, available agents whose performance metric(s) indicate that they are qualified to handle a particular type of call are selected to handle the call instead of other agents whose performance metric(s) may indicate that they are less qualified to handle the call.

Figure 1:
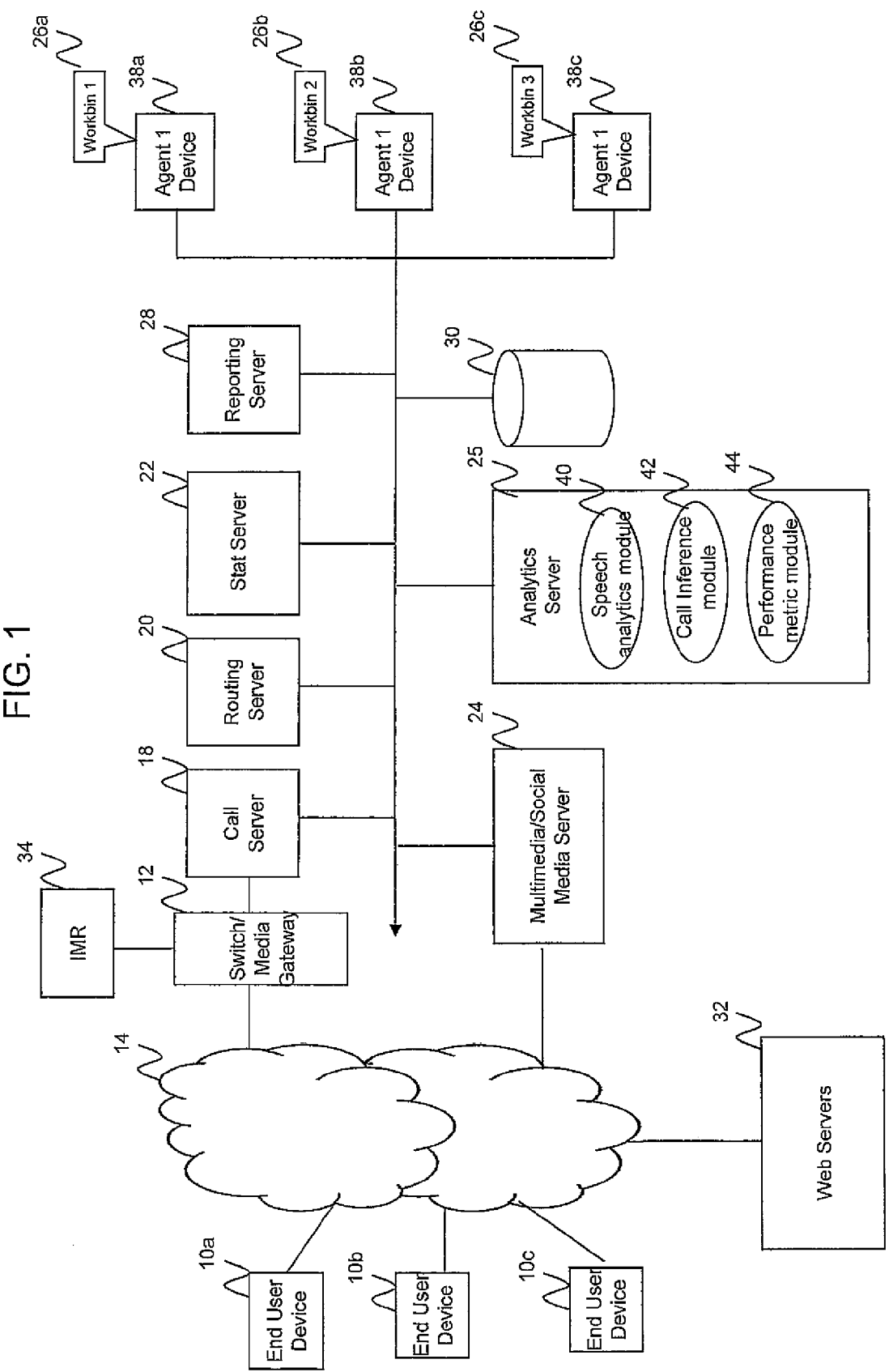
FIG. 1 is a schematic block diagram of a system supporting a contact center for routing interactions based on agent proficiency according to one exemplary embodiment of the invention.

FIG. 1 is a schematic block diagram of a system supporting a contact center for routing interactions based on agent proficiency according to one exemplary embodiment of the invention. The contact center may be an in-house facility to a business or corporation for serving the enterprise in performing the functions of sales and service relative to the products and services available through the enterprise. In another aspect, the contact center may be a third-party service provider. The contact center may be deployed locally in equipment dedicated to the enterprise or third-party service provider, and/or deployed in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound interactions, such as, for example, calls, to the contact center, via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling components of the contact center.

The contact center may also include a multimedia/social media server 24 for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive media response (IMR) server 34, which may also be referred to as a self-help system, virtual assistant, or the like. The IMR server 34 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR, customers may complete service without needing to speak with an agent. The IMR server 34 may also ask an open ended question such as, for example, "How can I help you?" and the customer may speak or otherwise enter a reason for contacting the contact center. The customer's response may then be used by the routing server 20 to route the call to an appropriate contact center resource.

If the call is to be routed to an agent, the call is forwarded to the call server 18 which interacts with a routing server 20 for finding an appropriate agent for processing the call. The call server 18 may be configured to process PSTN calls, VoIP calls, and the like. For example, the call server 18 may include a session initiation protocol (SIP) server for processing SIP calls. According to some exemplary embodiments, the call server 18 may, for example, extract data about the customer interaction such as the caller's telephone number, often known as the automatic number identification (ANI) number, or the customer's internet protocol (IP) address, or email address.

In some embodiments, the routing server 20 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, and SQLite, and may be stored in a mass storage device 30. The routing server 20 may query the customer information from the customer database via an ANI or any other information collected by the IMR 34 and forwarded to the routing server by the call server 18.

Once an appropriate agent is available to handle a call, a connection is made between the caller and an agent device 38a-38c (collectively referenced as 38) of the identified agent. Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via voice and other multimedia communication mechanisms.

The selection of an appropriate agent for routing an inbound call may be based, for example, on a routing strategy employed by the routing server 20, and further based on information about agent availability, skills, and other routing parameters provided, for example, by a statistics server 22. According to various embodiments of the present invention, the selection of the agent is also based on the agent's proficiency level in handling a specific topic identified for the call.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. For example, the reports may organize the information based on agent skills and/or skill levels. Call distribution reports may also be generated based on categorization of calls into specific call topics. The call distribution reports may indicate a number or percentage of calls with a specific call topic handled by the contact center for a particular time period. The reports may be generated automatically or in response to specific requests from a requestor (e.g. agent/administrator, contact center application, and/or the like).

According to one exemplary embodiment of the invention, the routing server 20 is enhanced with functionality for managing back-office/offline activities that are assigned to the agents. Such activities may include, for example, responding to emails, responding to letters, attending training seminars, or any other activity that does not entail real time communication with a customer. Selection of agents to handle these types of activities may also depend on proficiency levels of agents in handling specific issues identified for the activities. Once assigned to an agent, an activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the invention, the mass storage device(s) 30 may store one or more databases relating to agent data (e.g. agent profiles, schedules, etc.), customer data (e.g. customer profiles), interaction data (e.g. details of each interaction with a customer, including reason for the interaction, disposition data, time on hold, handling time, etc.), and the like. The one or more databases storing a customer's profile and interaction/case data may generally be referred to as a customer database. According to one embodiment, some of the data (e.g. customer profile data) may be provided by a third party database such as, for example, a third party customer relations management (CRM) database. The mass storage device may take form of a hard disk or disk array as is conventional in the art.

According to one embodiment, the system also includes an analytics server 25 which in turn includes a speech analytics module 40, call inference module 42, and a performance metric module 44. Each module may be implemented via computer instructions that are stored in memory and executed by a processor for providing particular functionality. For example, the speech analytics module 40 may contain instructions for analyzing audio of real-time or recorded calls, and storing the analysis data in the mass storage device 30. The analysis data may be, for example, classification of calls into predefined categories based on recognition of one or more phrases uttered by a customer. For example, a call may be classified as being "unresolved," upon detecting phrases such as, for example, "I'll call again later," A call may also be categorized as having a particular call topic such as, for example, "where is my stuff," based on recognition of phrases such as, for example, "I would like to check the status of my order."

The call inference module 42 may contain instructions for interacting with various contact center resources, such as, for example, the IMR server 34, speech analytics module 40, and/or one or more databases in the mass storage device 30, for deducing a reason for an incoming call, and storing the call reason in the customer database. The call inference module 42 may also be configured to populate a call distribution table used to collect a list of different call topics deduced from calls received by the contact center. The call distribution table may also be populated by other modules, such as, for example, the speech analytics module 40.

The terms "call" and "call reason" are used herein to refer to all types of interactions and interaction reasons. Such interactions may include but are not limited to telephony calls, emails, chat sessions, text messages, and other real-time and non-real time interactions.

The performance metric module 44 may contain instructions for computing, for each of various agents, one or more performance metrics associated with one or more different call topics. Each calculated performance metric may be stored in the mass storage device 30 in association with, for example, the particular agent. The stored performance metrics may be used by the routing server 20 to select an appropriate agent to handle a call for which a call reason may be deduced. In this regard, instead of relying on general skill parameters that may be hard-coded into a routing strategy, more specific agent skills/sub-skills that are not part of the hard-coded routing strategy may be considered along with the agent's track history in regards to such skills/sub-skills, in estimating the agent's performance to handle a call with a specific call reason, and routing the call to the agent with proficiency to handle the call.

For example, a general skill assigned to an agent may be "billing" for handling calls dealing with billing issues. If a call is identified as relating to a sub-issue of "billing," such as, for example, a double charge, changing a payment method, making a partial payment, or the like, instead of routing the interaction to any one of various agents having the general "billing" skill set, embodiments of the present invention allow the call to be routed to an agent with the general skill set but who is also predicted to perform well in dealing with the specific sub-issue. According to one embodiment, if an agent's performance consistently excels (e.g. is above a threshold) in various sub-issues (e.g. for handling double charges, changing a payment method, making a partial payment, etc.), then the agent's general skill level for "billing," may increase (e.g. from a level 3 to a level 4). Similarly, if an agent's performance consistently fails in various sub-issues, then the agent's general skill level may decrease.

According to one embodiment, the various call topics deduced by the call inference module 42 may be accessible to the configuration server for being added to a set of skills and sub-skills that may be enabled or disabled for a particular agent. For example, if a trend is detected of people calling in regards to a hot topic (e.g. the last iPhone release), the topic may be added to a general set of skills that may be enabled for an agent. Similarly, if no calls have been received for a period of time in regards to a particular call topic, the call topic may be flagged for being removed from the general set of skill. According to one embodiment, the addition and/or removal of skills by the configuration server may be automatic. In other embodiments, the addition and/or removal of skills does not occur until verified and allowed by an administrator.

According to one embodiment, detecting trends in regards to specific call topics may cause other types of updating such as, for example, adding a dedicated telephone number that customers may call to inquire about a specific call topic. In other embodiments, options provided by the IMR server may also be updated in response to detecting a trend in specific call topics. For example, an additional option directed to the specific call topic may be provided to connect customers to agents skilled to handle the specific call topic.

Figure 2:
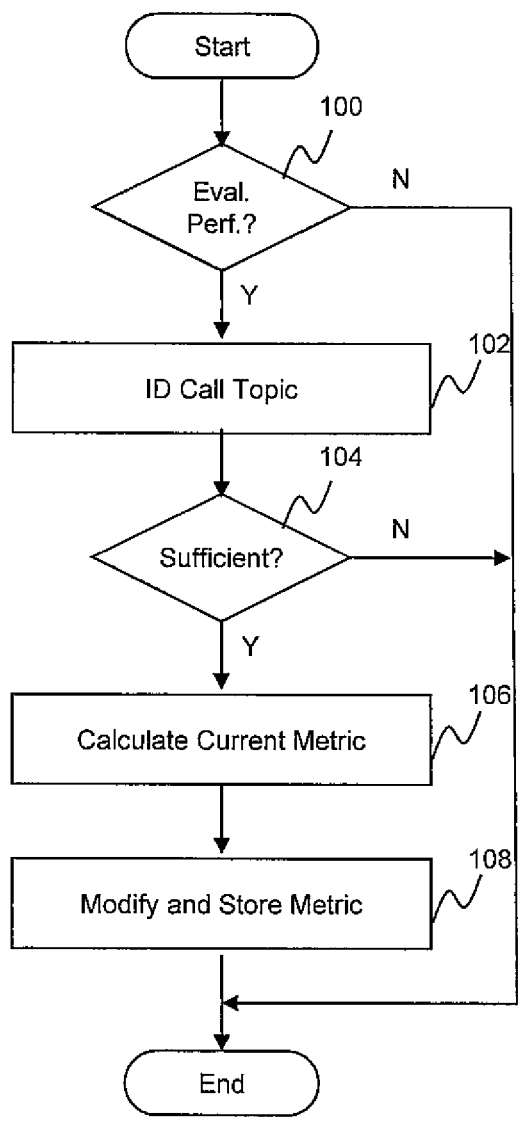
FIG. 2 is a flow diagram of a process for adding, adjusting, and/or removing a skill or sub-skill for a particular agent according to one embodiment of the invention.

FIG. 2 is a flow diagram of a process executed by the performance metric module 44 in adding, adjusting, and/or removing (collectively referred to as "modifying") a skill or sub-skill for a particular agent according to one embodiment of the invention. The term skill and sub-skill are used interchangeably herein. The process may be described in terms of a software routine executed by a processor based on instructions stored in memory. The instructions may also be stored in other non-transient computer readable media such as, for example, a CD-ROM, flash drive, or the like. A person of skill in the art should also recognize that the process may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

In act 100, the performance metric module 44 determines whether a condition for triggering evaluation of the agent's performance is detected. For example, the evaluation may be triggered at particular times or intervals, such as, for example, on a weekly basis, every 30 days, on specified days and/or times, after a certain number of calls have been handled by the agent, after a certain number of hours logged by the agent, and/or the like. The invoking of the evaluation may be automatic upon detecting the occurrence of a trigger condition. The invoking of the evaluation may also be manual, such as, for example, in response to a user command to start the evaluation.

If the condition for triggering evaluation of the agent's performance is detected, the performance metric module 44 identifies a call topic in act 102. The call topic may be selected from a list of call topics collected for a particular time period (e.g. in the last 30 days) based on all (or a subset) of calls to the contact center, the agent, group of agents, and/or the like. For example, the call inference module 42 may work together with the speech analytics module 40 to collect call topics of incoming interactions including telephony calls. The list of call topics collected by the call inference module 42 may be stored in the mass storage device 30 for retrieval by the performance metric module 44 when needed.

In act 104, the performance metric module 44 determines whether the agent has handled a sufficient number of calls (e.g. at least 10) dealing with the identified call topic. The number may be set, for example, by an administrator. If the answer is YES, the module 44, in act 106, calculates a performance metric for the call topic. Different types of performances may be evaluated by the performance metric module. The type of performance that is evaluated may depend on the configuration of performance metric module 44. For example, the performance metric module may be configured to evaluate the agent's ability to resolve an issue the first time the customer calls about the issue, referred to as first call resolution (FCR). Other types of performances may also be evaluated, such as, for example, handling time, customer satisfaction, sales conversions, debt collection, compliance with regulations, customer retention (preventing churn), and the like.

Taking first call resolution as an example, a metric indicative of how the agent is performing in this area may be calculated according to the following formula:

$$UNRESLV = \frac{(ALL\_CALLS\_ABOUT\_X \cap ALL\_CALLS\_UNRESOLVED)}{(ALL\_CALLS\_ABOUT\_X)} * 100\% \quad \text{Equation 1}$$

ALL_CALLS_ABOUT_X—all calls to the call center in the last 30 days (or other configurable time unit) handled by the particular agent that were about the topic X. For example, the topic may related to increasing the spending limit on a credit card.

ALL_CALLS_UNRESOLVED—all calls to the call center in the last 30 days (or other configurable time unit) that the particular agent handled that were classified as not resolved. A call may be classified as unresolved if phrases such as, for example, "This doesn't help," "I'll need to call again," or "Sorry that I couldn't help you with this," are mentioned. Whether a call is resolved or not may be a binary determination—the answer is either Yes or No. Other types of performances may not entail a binary determination.

According to equation 1, UNRESLV measures the particular agent's first call resolution performance in terms of percentage of unresolved calls from the overall calls on the particular topic X.

Taking handling time as another example, a metric indicative of how an agent is performing in this area may be calculated using an equation similar to equation 1. For example, the formula may be:

$$HIGHHT = \frac{(ALL\_CALLS\_ABOUT\_X \cap ALL\_CALLS\_HIGHHNDLETIME)}{(ALL\_CALLS\_ABOUT\_X)} * 100\%$$ Equation 2

According to equation 2, HIGHHT measures the particular agent's handling time performance in terms of percentage of calls with high handling time from the overall calls on the particular topic X. Here, the variable ALL_CALLS_HIGHHENDLTIME are all calls to the call center in the last 30 days (or other configurable time unit) that the particular agent handled where the handling time was above a threshold time (e.g. above 5 minutes).

According to another embodiment, measurement of an agent's handling time performance may not entail a binary determination as in equation 2. Instead, the performance value may be the actual average handling time of an agent when handling calls relating to a particular topic. An average handling time performance value may be, for example, 5.2 minutes.

According to one embodiment, the metric that is calculated in act 106 may be a short term metric that takes into account the agent's performance over a short term period. For example, the agent's performance may be calculated afresh every 30 days. According to one embodiment, a historical (long term) metric may also be calculated in addition or in lieu of the short term metric. For example, the historical metric may be an average of all past short term metrics calculated for the agent.

In act 107, the agent's skill information is modified based on the calculated metric. In this regard, the performance metric module 44 retrieves the skills and associated values stored for the agent in the mass storage device 30. If the call topic is already enabled as a skill for the particular agent, the performance metric module 44 determines whether the currently calculated metric differs from the stored metric. If so, the stored metric is replaced with the currently calculated metric. If the call topic is not already enabled as a skill for the particular agent, the skill is added/enabled as a new skill for the agent, and the calculated metric is stored in association with the added skill.

According to an embodiment of the invention, the performance metric module 44 may be configured to modify a performance level of a general skill based on knowledge on actual performance on sub-skills related to the general skill. For example, if an agent shows a trend of performing above a threshold level on all (or a portion of) the sub-skills, the performance level of the general skill may be increased. Similarly, if the agent shows a trend of performing below a threshold level on all (or a portion of) the sub-skills, the performance level of the general skill may be decreased.

Figure 3:
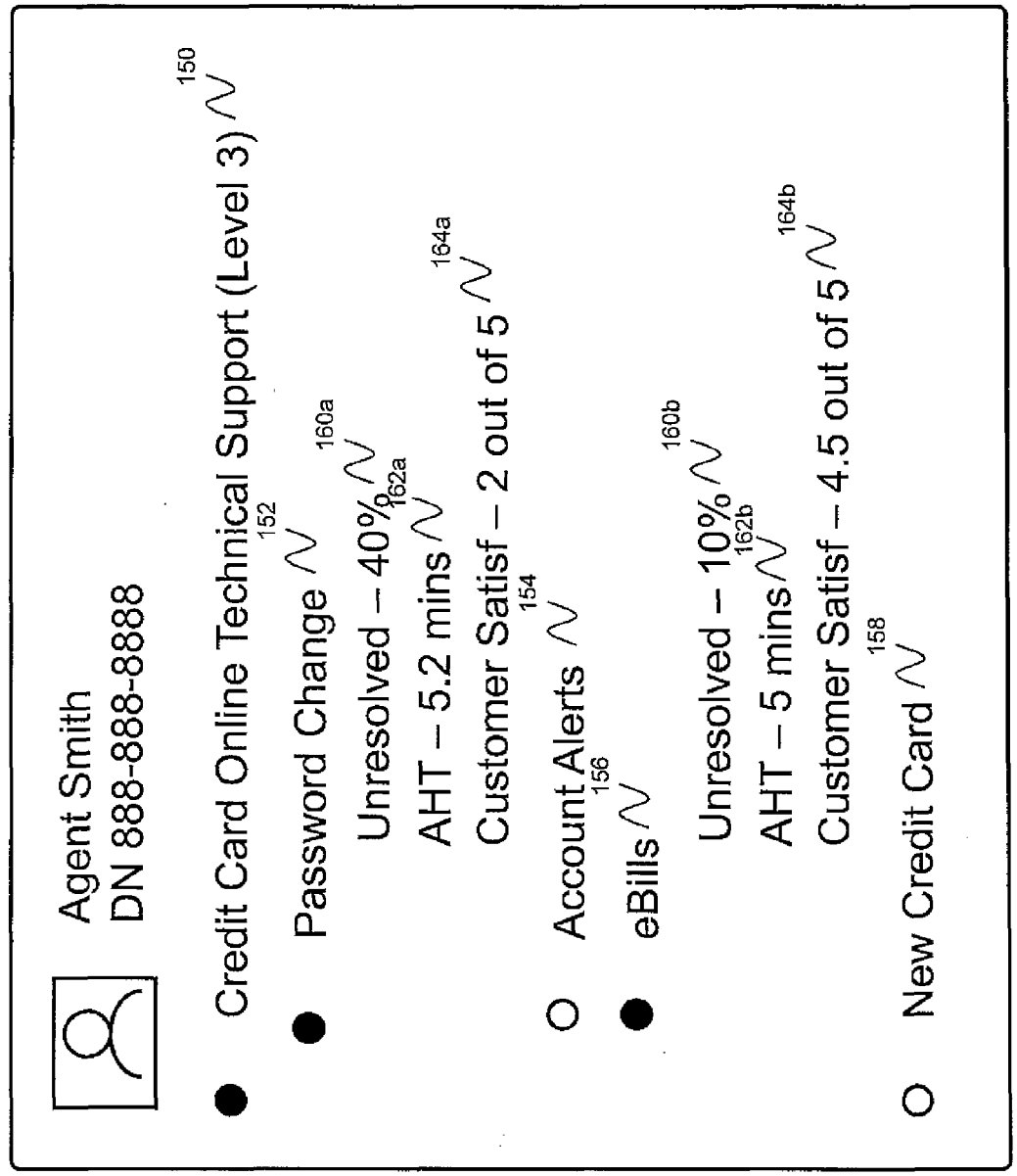
FIG. 3 is a conceptual layout diagram of exemplary skills and sub-skills that may be enabled or disabled for a specific agent according to one embodiment of the invention.

FIG. 3 is a conceptual layout diagram of exemplary skills and sub-skills that may be enabled or disabled for a specific agent according to one embodiment of the invention. In the example of FIG. 3, Agent Smith logged on to directory number (DN) 888-888-8888. Agent Smith has a "credit card online technical support" skill 150 that is enabled while a "new credit card" skill 158 is not enabled. The "credit card online technical support" skill 150 is assigned a level 3 (e.g. out of 5), indicative of the agent's proficiency in handling this general skill. According to one embodiment, the initial skill level assignment for general skills may be based on certifications received by the agent, based on tests taken by the agent, or the like.

In the example of FIG. 3, various sub-skills are enabled for Agent Smith, including "password change" 152 and "eBills" 156. The enabled sub-skills 152, 156 indicate that the agent has had experience in handling calls relating to the specific call topics. Other sub-skills, such as, for example, "account alerts" 154, are not enabled, indicating that the agent has not shown enough of a track record in handling calls relating to this topic.

In the example of FIG. 3, three performance measurements are shown for each enabled sub-skill/call topic 152, 154. Such performance measurements relate to unresolved calls 160a, 160b, average handling time 162a, 162b, and customer satisfaction 164a, 164b. Agent Smith in the example of FIG. 3 has a performance metric of 40% for unresolved calls when dealing with the call topic "password change," while he has a performance metric of only 10% for unresolved calls when dealing with the call topic "eBills." Thus, agent Smith is more proficient, at least in terms of first time call resolution, when dealing with calls about eBills than when dealing with calls about password change.

In regards to average handle time, the example of FIG. 3 shows that it takes Agent Smith an average of 5.2 minutes in handling calls about password change while it takes him an average of 5 minutes in handling calls about eBills. For customer satisfaction, Agent Smith gets an average rating of 2 out of 5 from customers calling about password change, while he gets an average rating of 4.5 out of 5 from customers calling about eBills.

Figure 4:
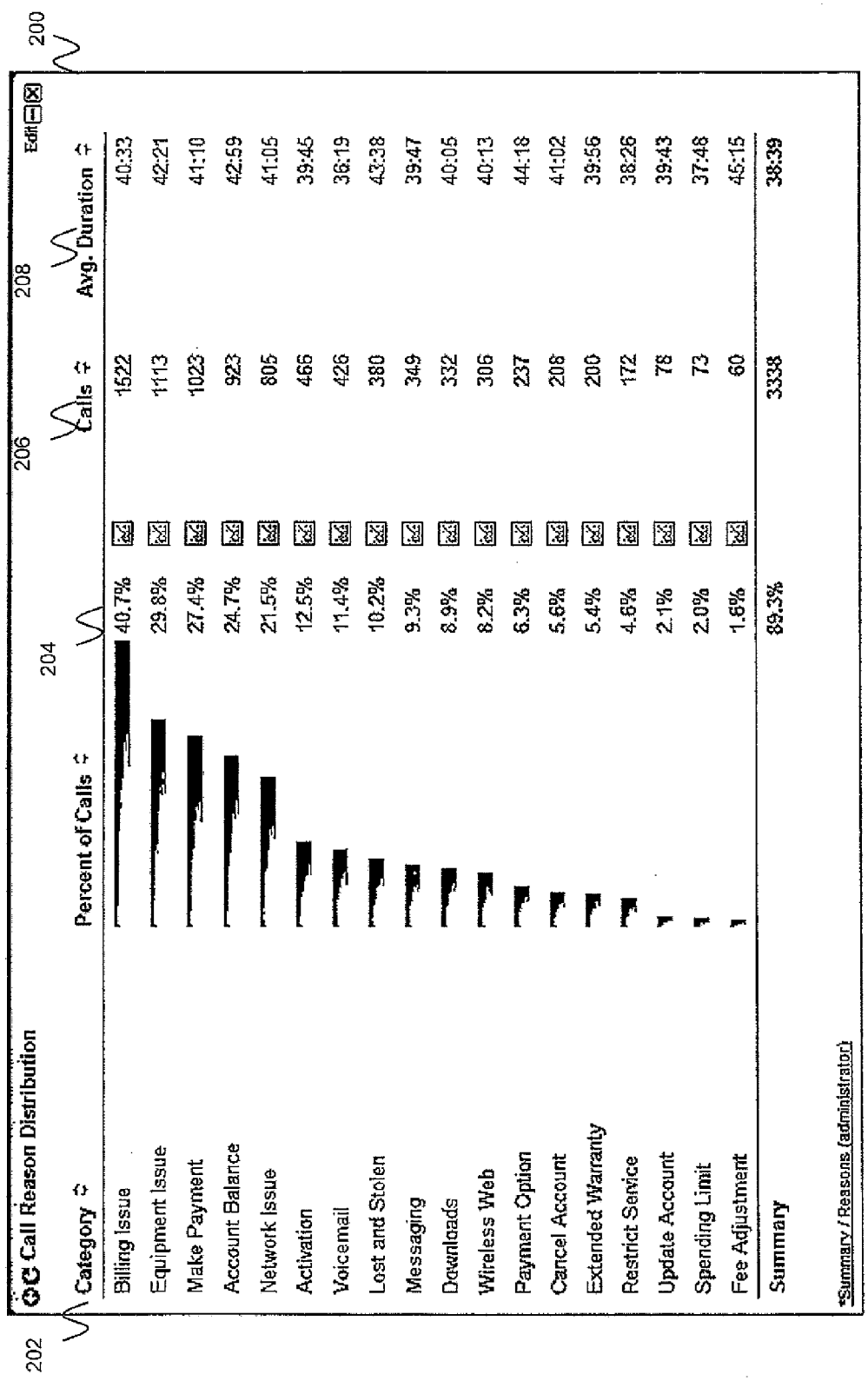
FIG. 4 is a conceptual layout diagram of a call distribution table according to one embodiment of the invention.

FIG. 4 is a conceptual layout diagram of a call distribution table 200 that may be populated by the call inference module 42 or speech analytics module 40 according to one embodiment of the invention. The call distribution table 200 includes a list of call topics/categories 202 inferred for the calls received by the call center, a specific agent, a department, or group of agents, during a particular time period. The categories relate to specific call topics, such as, for example, billing issue, equipment issue, and the like. The call distribution table 200 further includes a percentage of calls 204, total number of calls 206, and average duration of the calls 208 detected for the particular time period. Other information may also be maintained in the call distribution table, such as, for example, a time period during which the listed call topics where detected, identifiers of agents handling each category, and the like. In the embodiment that the call distribution table 200 is specific to a particular agent, the table may be stored in association with an agent ID and/or DN.

According to one embodiment, an incoming call may be classified under a particular call topic/category 202 based on recognition of a call as being a repeat call. For example, if a call is a repeat call and a prior customer issue was not resolved during a prior call, an inference may be made, at least initially, that the call reason for the current call is the same as the unresolved issue from the prior call. For instance if in a prior call a caller asked the agent "How do I program my DVR from my mobile phone," and the agent's answer was "I can't help you with this, you might want to visit our website," the speech analytics module may be configured to analyze the content of the call, recognize the specific utterances, and classify the call reason as being "DVR Programming." The speech analytics module may further classify the call as "unresolved." The classification information is stored in the customer database. When the caller calls again, the customer database may be inquired to retrieve a most recent unresolved call reason, and inquire the caller whether the caller is calling to resolve the issue. For example, the IMR server 34 may be prompted to ask, "I see that you had called before to inquire about programming your DVR. Would you like to be connected to an agent who can help you with this?" If the customer responds "Yes," then the prior call reason is set as the current call reason.

Of course, as a person of skill in the art should appreciate, the call reason for a repeat call may also be deduced without invoking the IMR server. For example, if the repeat call is received within a certain period of time (e.g. within 15 minutes) of an unresolved call, an assumption may be automatically made that the caller is calling about the unresolved issue (e.g. "DVR Programming") and not request express confirmation from the caller. In this case, the prior unresolved call reason is automatically set as the current call reason.

A call reason may also be inferred based on the customer's interaction with the IMR server 34 (FIG. 1). For example, the IMR server 34 may be configured to ask the customer an open-ended question to elicit information on the reason for the call. For example, the IMR server 34 may be configured to ask "How can I help you?" The customer may answer by speaking a reason for the call, such as, for example, "Am I eligible to upgrade my phone?" According to one embodiment, the phrase uttered by the customer is analyzed by the speech analytics module 40 and the call is then categorized into a particular category, such as, for example, an "upgrade eligibility" category. In other embodiments, the question asked by the IMR server 34 is not open-ended, but limits the caller's response to, for example, a particular subject. Of course, the IMR server 34 may also be configured to function as a traditional IVR where the customer is provided a list of reasons for the call, and the customer presses a number that matches his or her reason for the call. The call reason may be deduced from the particular number pressed by the customer.

In other embodiments, a call reason may also be deduced based on other modalities, such as, for example, the customer's interactions using other communication channels, such as, for example, the Web, retail shops, email, chat channels, mobile applications, social media channels, and the like. Multi-channel analytical solutions such as, for example, Genesys Text Analytics offered by Genesys Telecommunications Laboratories, Inc., may be used to analyze a customer's previous engagement to identify a previous problem and/or needs before connecting a current call to a contact center agent. For example, a customer may be browsing a company web page relating to "Flying with Pets Policy" when the customer selects a "speak with an agent" option. Information on the page being browsed may be transmitted along with the request to speak with the agent, and from the transmitted information it may be inferred that the customer's reason for wanting to speak with the agent is related to "Flying with Pets."

Figure 5:
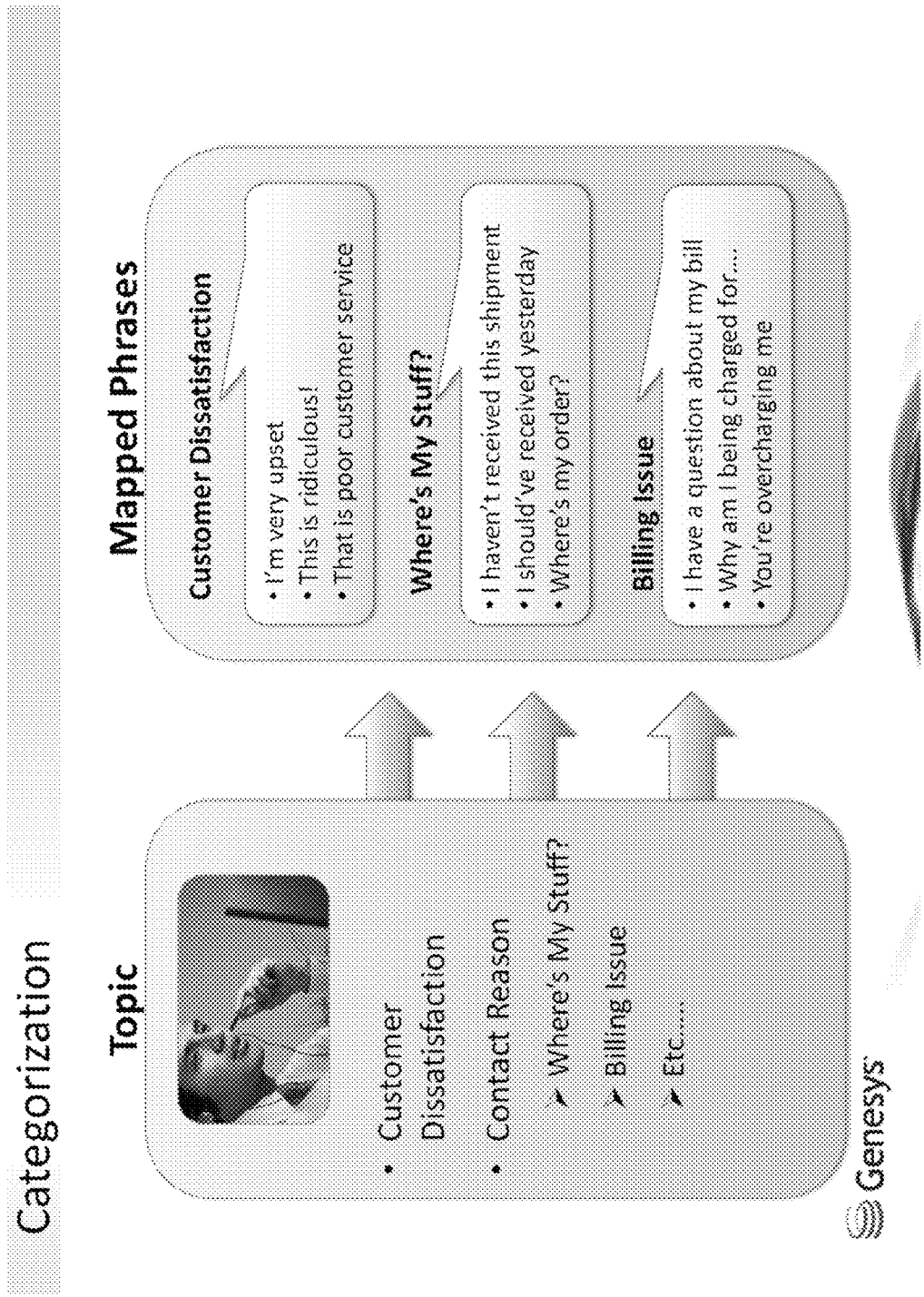
FIG. 5 is a conceptual layout diagram of a process engaged by a speech analytics module for assigning topics based on specific spoken phrases detected during a conversation between a customer and an agent according to one embodiment of the invention.

FIG. 5 is a conceptual layout diagram of a process engaged by the speech analytics module 40 for assigning topics based on specific spoken phrases detected during a conversation between a customer and an agent according to one embodiment of the invention. The phrases may be recorded phrases from a prior call, or phrases detected in real-time during a current call (e.g. while the caller is interacting with the IMR server 34). According to one embodiment, each topic is defined as union of phrases. If a caller says "Where's my order?" or "I haven't received this shipment," then the call is classified as belonging to the "where's my stuff?" topic. If during the same call the caller says "This is not answering my question," or "I will have to call back," or the agent says "I can't help you with this," the call is also classified as belonging to an "unresolved" topic. Calls may be classified based on detected phrases according to the methodology described in U.S. Pat. No. 7,487,094, the content of which is incorporated herein by reference. By classifying the call reason and whether the call has been resolved or not, and storing the information in, for example, a customer database, the speech analytics module 40 generates relevant information that is used for more optimal routing of calls based on an agents performance in handling calls with the identified issues.

Figure 6:
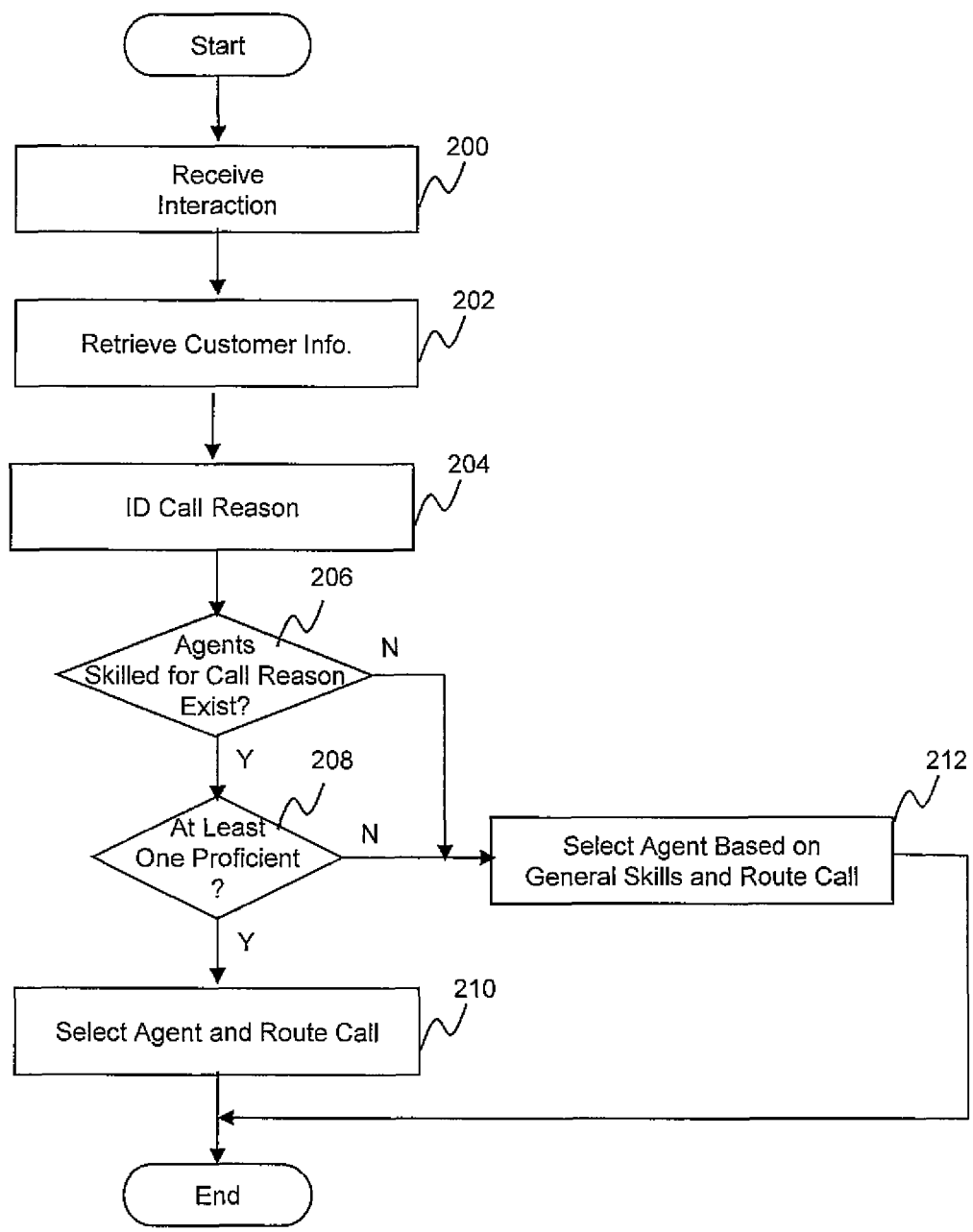
FIG. 6 is a flow diagram of a process for performance-based routing of interactions to agents according to one embodiment of the invention.

FIG. 6 is a flow diagram of a process for performance-based routing of interactions to agents according to one embodiment of the invention. Although real-time inbound calls is used as an example, a person of skill in the art should recognize that the process may also extend to non-real-time tasks, such as, for example responding to emails. The process may be described in terms of a software routine executed by a processor based on instructions stored in memory. The instructions may also be stored in other non-transient computer readable media such as, for example, a CD-ROM, flash drive, or the like. A person of skill in the art should also recognize that the process may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

The process starts, and in act 200, an inbound interaction to a particular route point is received, and a message is transmitted to inform, for example, the call server 18 (for telephony calls) or the multimedia server 24 (for other multimedia interactions) of the interaction. The message may include information on the interaction such as, for example, for telephony interactions, the telephone number that was dialed and/or telephone number of the calling customer. If the interaction is a non-telephony interaction, such as, for example, an email, the information that is included in the message may be the sender and recipient's email addresses.

According to one embodiment, the routing server 20 is invoked to route the interaction to an appropriate contact center resource. In this regard, the routing server 20 may be configured to execute a routing strategy configured for the particular route point for routing the interaction. The routing strategy may, for example, invoke the call inference module 42 to deduce the reason or topic for the call in order to identify agents with skills on a more granular level than the skills that may be hardcoded into the particular routing strategy.

In act 202, the call inference module 42 may be configured to use information gathered about the interaction (e.g. customer's telephone number) to perform a lookup in the customer database for information on the customer and his/her past interactions. Based on the lookup, the call inference module 42 may deduce, in act 204, the call reason/topic for the current interaction. For example, lookup of the customer database may indicate that the current call is associated with a prior call (e.g. it is a repeat call), and that the prior call dealing with a particular issue was unresolved. The call inference module 42 may also be configured to infer the call reason based on information provided by other modalities, such as, for example, the IMR server 34. The inferred call reason may be returned to the routing server 20 for use in routing the current interaction.

In act 206, the routing strategy invoked by the routing server 20 may inquire whether agents exist that have experience in handling the particular call reason. For example, instead of looking for agents with a general skill set (e.g. agents with level 3 or higher for "billing"), the routing strategy may be configured to first look for agents with the skill set "billing" but who also have specific sub-skills enabled under "billing," where the sub-skills match the inferred call reason, such as, for example, "double charges," indicating that the agent has dealt with this particular call topic in the past.

If one or more available agents exist with the specific sub-skill enabled, the routing server 20 may determine, in act 208, whether there is at least one agent who has demonstrated at least a minimum level of proficiency in dealing with the particular call topic. According to one embodiment, the routing server 20 determines, in act 208, whether there is at least one agent whose proficiency level for the particular call topic satisfies a threshold proficiency level. The threshold proficiency level may be user defined, and may vary depending on the type of proficiency that is measured. Also, the type of proficiency that is considered may vary depending on the type of calls that are being handled. For example, in some situations, the proficiency that is considered may be an agent's first call resolution. In this example, the agent's proficiency level may measure a percentage of unresolved calls by the agent dealing with particular call topics. In other situations, the proficiency that is considered may be an average handling time, and/or customer satisfaction ratings. A combination of the different types of proficiencies may also be considered. For example, the routing server 20 may be configured to look for an agent with at least a minimum level of proficiency in all (or a portion) of the different types of proficiencies to give preference to that agent in handling a particular type of call.

If there are one or more agents who have demonstrated at least a minimum level of proficiency for the identified sub-skill, the routing server 20 is configured, in act 210, to select from the identified agents and instruct the call to be routed to the selected agent. According to one embodiment, if there are multiple agents with at least a minimum level proficiency, the agent that is actually selected may depend on the particular selection algorithm that is employed. For example, the selection algorithm may rank the identified agents based on their proficiency levels and give priority to agents with the higher proficiency levels before routing calls to agents with the lower proficiency levels. In other examples, the selection algorithm may simply select an agent randomly or on a round robin basis. The selection algorithm may also select an agent based on the type of customer that is to be serviced (e.g. highest performing agent for a Gold customer, and a next highest performing agent for a Silver customer). Thus, taking billing as an example, given a set of agents having the skill set to deal with billing issues generally, if a call is for a specific type of billing issue (e.g. double charge), the call may be routed to an agent having more proficiency in dealing with double charge issues that another agent, also proficient in billing generally, but less proficient in dealing with double charge issues.

Referring again to acts 206 and 208, if either there are no agents who have experience handling interactions dealing with the identified call reason, or even if such agents exist, if none have demonstrated at least a minimum level of proficiency in handling these types of interactions, the routing server 20 is configured to, in act 212, route the call to an available agent based on general skill sets identified in the routing strategy. Of course, if no such agent exists, the interaction is routed to any available agent.

Figure 7:
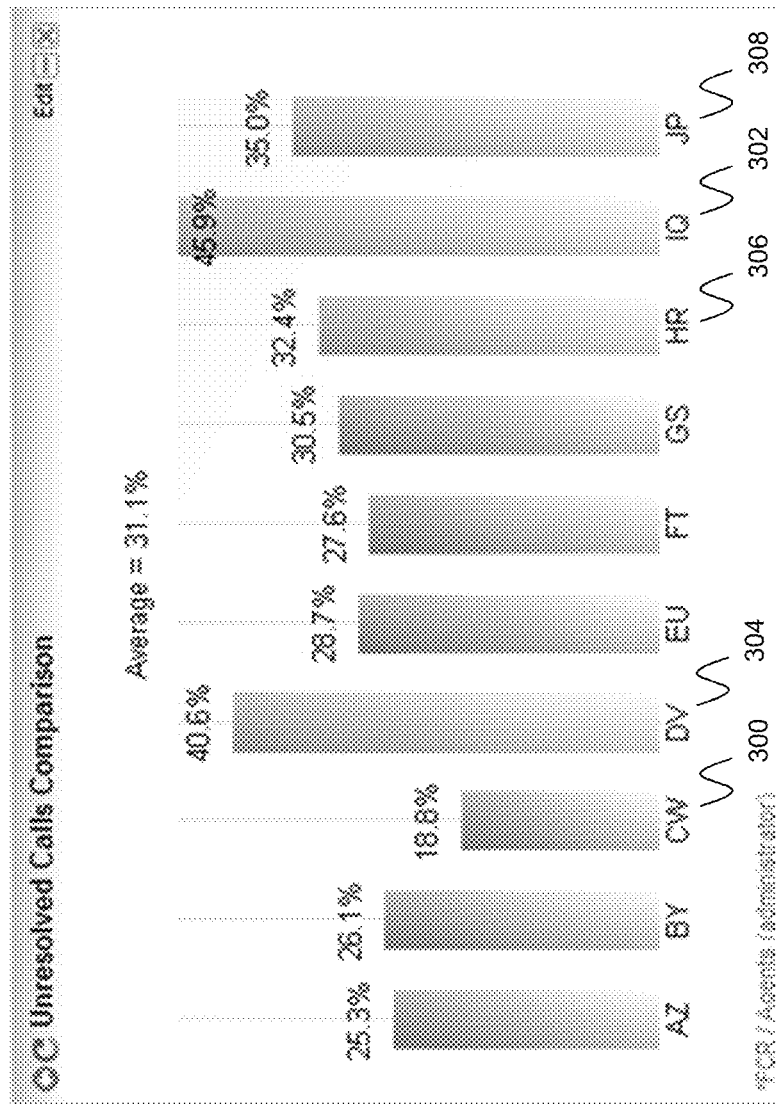
FIG. 7 is a conceptual layout diagram of exemplary proficiency levels of agents where the proficiency is first call resolution for a particular call topic according to one embodiment of the invention.

FIG. 7 is a conceptual layout diagram of exemplary proficiency levels of agents where the proficiency is first call resolution for a particular call topic (not shown). In order to determine an agent's first call resolution proficiency, a measurement of a percentage of calls that terminate without resolving the call issue is monitored and tracked for each agent. In the exemplary diagram, agent CW 300 is the most proficient with 18.8% of calls he has handled terminating without resolution. Agent IQ 302, on the other hand, is the least proficient with 45.9% of calls terminating without resolution. In this example, the average proficiency level is 31.1%, and this may be used as the threshold proficiency before an agent is considered for handling the specific call topic. According to this example, agents DV 304, HR 306, IQ 302, and JP 308 have unresolved calls above the threshold level of 31.1%. Thus, according to one embodiment, if other agents with a higher proficiency are available (e.g. CW 300), a call with the specific call topic is routed to the agents with the higher proficiency.

Each of the various servers, controllers, switches, gateways, engines, and/or modules (collectively referred to as servers) in the afore-described figures may be a process or thread, running on one or more processors, in one or more computing devices 1500 (e.g., FIG. 8A, FIG. 8B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 8A:
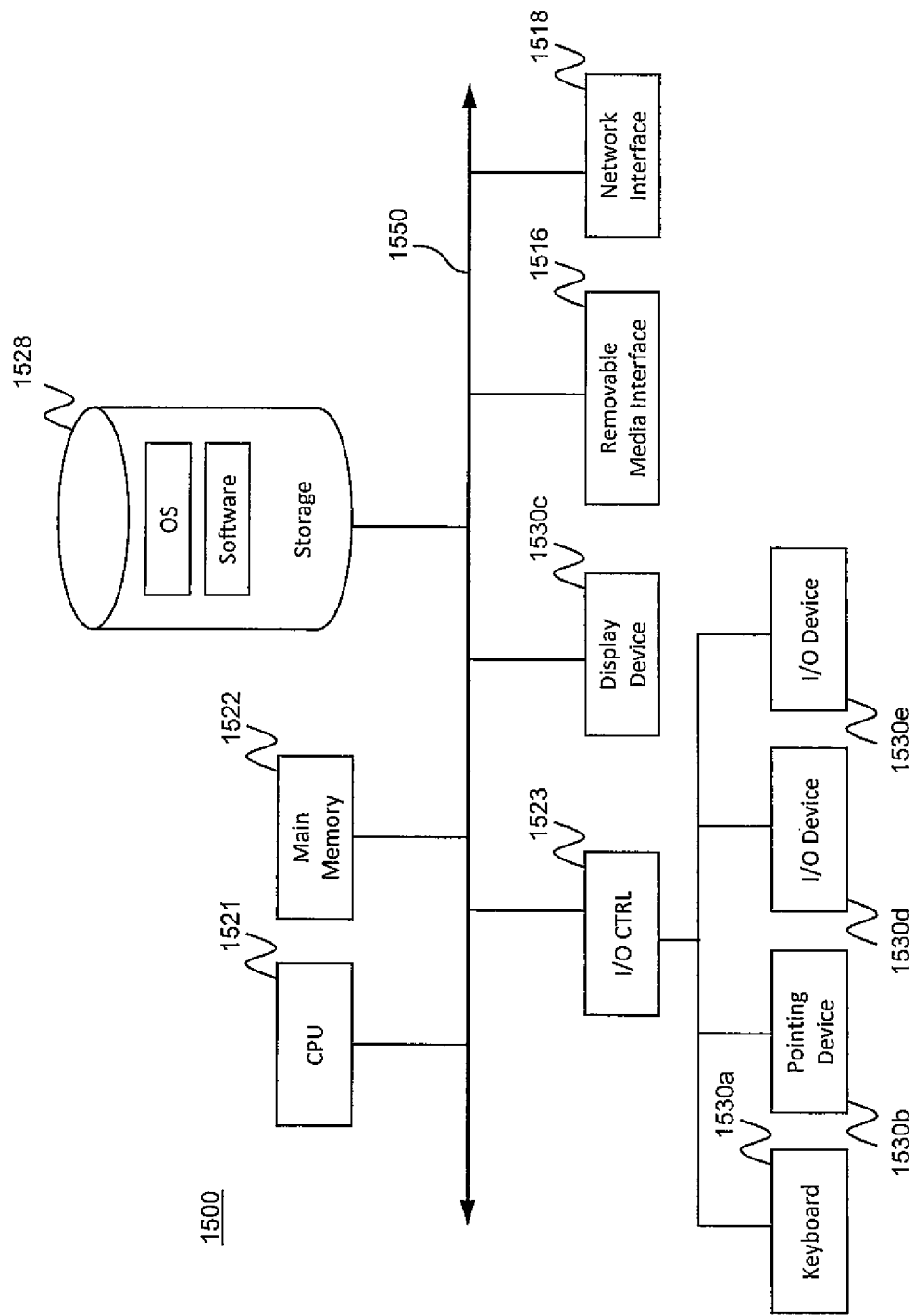
FIG. 8A is a block diagram of a computing device according to an embodiment of the present invention.
Figure 8B:
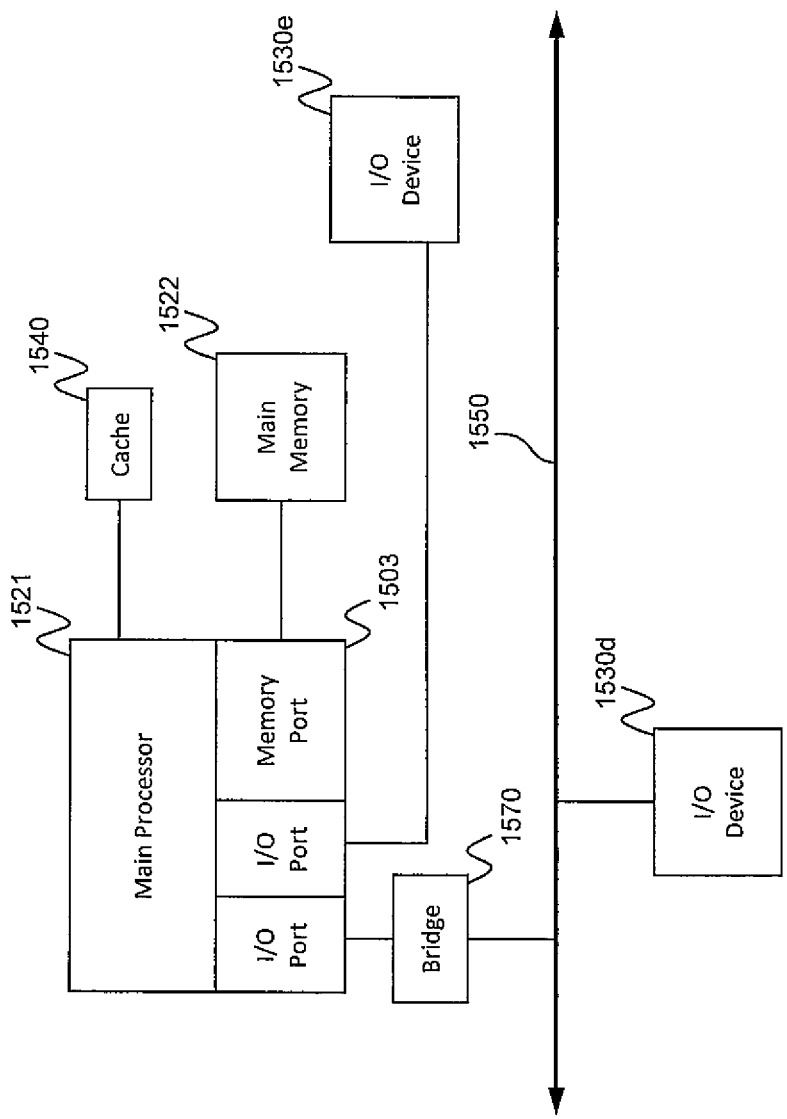
FIG. 8B is a block diagram of a computing device according to an embodiment of the present invention.

FIG. 8A and FIG. 8B depict block diagrams of a computing device 1500 as may be employed in exemplary embodiments of the present invention. Each computing device 1500 includes a central processing unit 1521 and a main memory unit 1522. As shown in FIG. 8A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 8B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 8A, the central processing unit 1521 communicates with the main memory 1522 via a system bus 1550. As shown in FIG. 8B, the central processing unit 1521 may also communicate directly with the main memory 1522 via a memory port 1503.

FIG. 8B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 8A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 8B depicts an embodiment of a computer 1500 in which the central processing unit 1521 communicates directly with I/O device 1530e. FIG. 8B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 8A, may control the I/O devices. The I/O controller may control one or more I/O devices such as a keyboard 1530a and a pointing device 1530b, e.g., a mouse or optical pen.

Referring again to FIG. 8A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 8A and FIG. 8B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 8D:
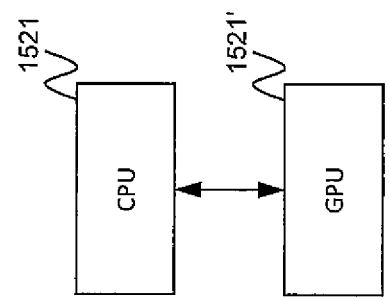
FIG. 8D is a block diagram of a computing device according to an embodiment of the present invention.
Figure 8C:
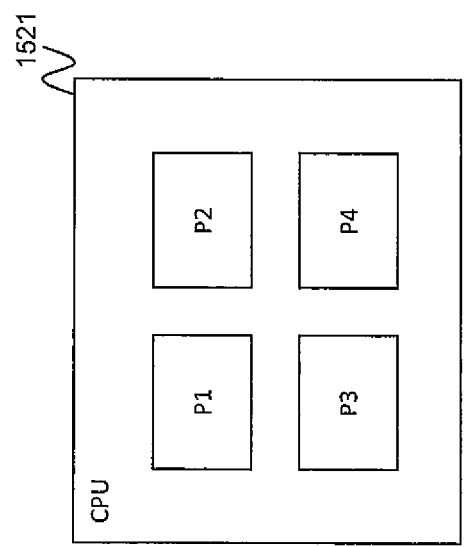
FIG. 8C is a block diagram of a computing device according to an embodiment of the present invention.

As shown in FIG. 8C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 8D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

A computing device may be one of a plurality of machines connected by a network, or it may comprise a plurality of machines so connected. FIG. 8E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 8E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

It is the Applicant's intention to cover by claims all such uses of the invention and those changes and modifications which could be made to the embodiments of the invention herein chosen for the purpose of disclosure without departing from the spirit and scope of the invention. The particular manner in which template details are presented to the user may also differ. Thus, the present embodiments of the invention should be considered in all respects as illustrative and not restrictive, the scope of the invention to be indicated by claims and their equivalents rather than the foregoing description.

The invention claimed is:

1. A method for performance-based routing of interactions in a contact center comprising:

receiving, by a processor, information on an interaction to be routed;

identifying, by the processor, a topic associated with the interaction;

identifying, by the processor, one or more agents having experience handling the topic based on a skill level of the one or more agents corresponding to the topic;

determining, by the processor, a proficiency level of the identified agents in handling the topic;

adjusting, by the processor, the skill level of the one or more agents corresponding to the topic according to changes in the proficiency level of the one or more agents in handling the topic;

selecting, by the processor, one of the identified agents having at least a minimum level of skill proficiency in handling the topic, wherein the selecting of one of the identified agents having at least a minimum level of proficiency includes:

identifying, by the processor, a threshold performance value;

comparing, by the processor, the proficiency level of the identified agents against the threshold performance value;

selecting, by the processor, the one of the identified agents based on the comparison;

transmitting a message, by the processor, for routing the interaction to the selected agent; and routing, by a switch, the interaction to a contact center resource in response to the message.

2. The method of claim 1, wherein the proficiency level of a particular agent is calculated based on past interactions by the particular agent in handling interactions with a same topic.

3. The method of claim 1, wherein the proficiency level of a particular agent is indicative of the ability of the particular agent to resolve the topic a first time the topic is raised in an interaction.

4. The method of claim 3 further comprising:
recognizing, by the processor, a phrase uttered by a customer or agent during a past interaction;
categorizing, by the processor, the past interaction as being unresolved based on the recognized phrase; and
calculating, by the processor, the proficiency level based on a number of past interactions categorized as being unresolved.

5. The method of claim 1, wherein the proficiency level of a particular agent is indicative of a time it takes the agent in handling interactions associated with the topic.

6. The method of claim 1, wherein the topic is identified as a specific agent skill, wherein identifying by the processor the one or more agents includes identifying by the processor one or more agents with the specific agent skill enabled.

7. The method of claim 1, wherein the identifying of the topic includes:
recognizing a phrase uttered by a customer or agent; and
identifying the topic based on the recognized phrase.

8. The method of claim 7, wherein the phrase is uttered during interaction by the customer with an interactive media response server.

9. A system for performance-based routing of interactions in a contact center comprising:
processor;
memory, the memory storing instructions that, when executed by the processor, cause the processor to:
identify information on an interaction to be routed;
identify a topic associated with the interaction;
identify one or more agents having experience handling the topic based on a skill level of the one or more agents corresponding to the topic;
determine a proficiency level of the identified agents in handling the topic;
adjust the skill level of the one or more agents corresponding to the topic according to changes in the proficiency level of the one or more agents in handling the topic;
select one of the identified agents having at least a minimum level of proficiency in handling the topic, wherein the instructions that cause the processor to select one of the identified agents having at least a minimum level of proficiency includes instructions that cause the processor to:
identify a threshold performance value;
compare the proficiency level of the identified agents against the threshold performance value;
select the one of the identified agents based on the comparison; and
transmit a message for routing the interaction to the selected agent; and
a switch configured to route the interaction to a contact center resource, in response to the message.

10. The system of claim 9, wherein the proficiency level of a particular agent is calculated based on past interactions by the particular agent in handling interactions with a same topic.

11. The system of claim 9, wherein the proficiency level of a particular agent is indicative of the ability of the particular agent to resolve the topic a first time the topic is raised in an interaction.

12. The system of claim 11, wherein the instructions further cause the processor to:
recognize a phrase uttered by a customer or agent during a past interaction;
categorize the past interaction as being unresolved based on the recognized phrase; and calculate the proficiency level based on a number of past interactions categorized as being unresolved.

13. The system of claim 9, wherein the proficiency level of a particular agent is indicative of a time it takes the agent in handling interactions associated with the topic.

14. The system of claim 9, wherein the topic is identified as a specific agent skill, wherein identifying by the processor of the one or more agents includes identifying by the processor one or more agents with the specific agent skill enabled.

15. The system of claim 9, wherein the instructions the cause the processor to identify the topic further includes instructions that cause the processor to:
recognize a phrase uttered by a customer or agent; and
identify the topic based on the recognized phrase.

16. The system of claim 15, wherein the phrase is uttered during interaction by the customer with an interactive media response server.

17. The method of claim 1, wherein the proficiency level of the one of the identified agents corresponds to a plurality of topics and has a different value for each of the topics.

18. The system of claim 9, wherein the proficiency level of the one of the identified agents corresponds to a plurality of topics and has a different value for each of the topics.

* * * * *